Dec. 15, 1931.  W. S. ZEHRUNG  1,836,947
PROCESS OF REFINING CRUDE MINERAL OILS
Filed June 1, 1926
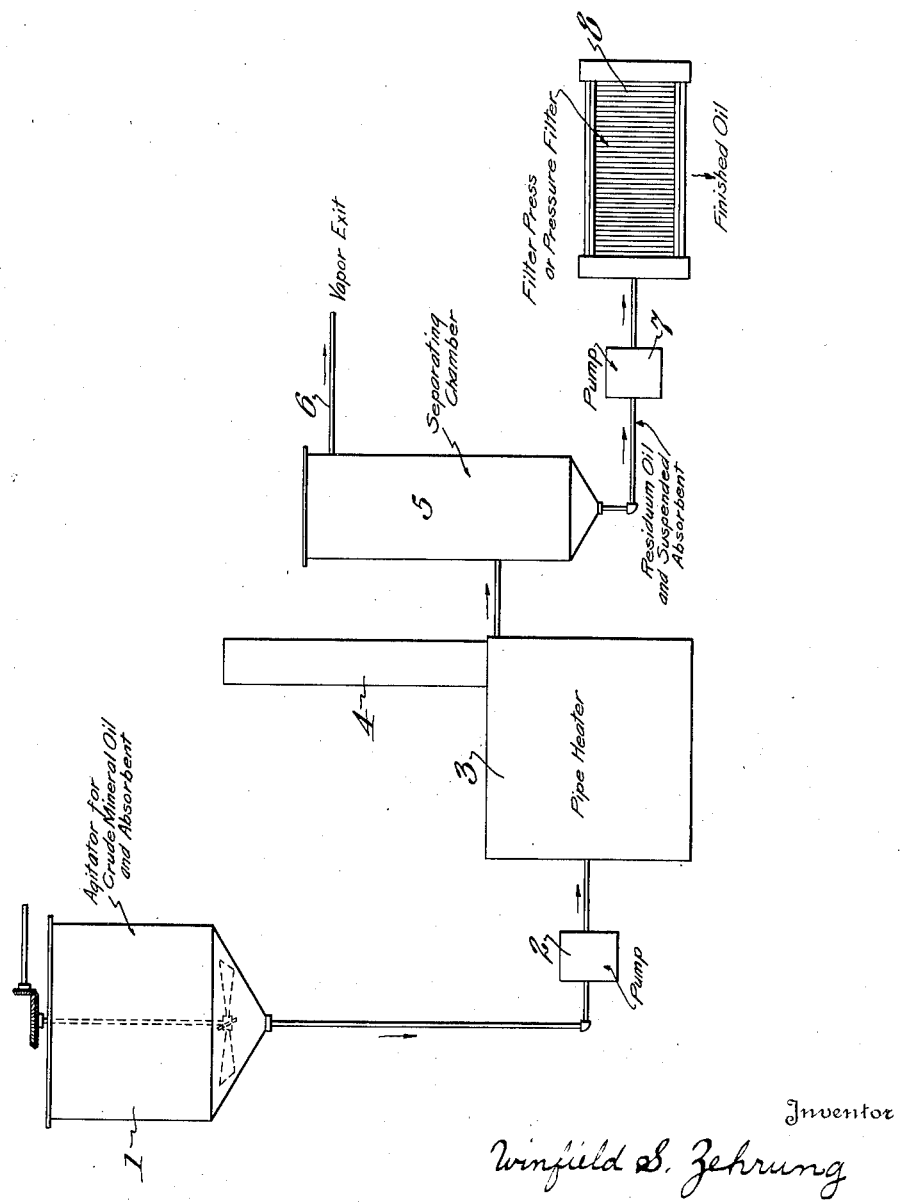
Inventor
Winfield S. Zehrung
By Byrnes Townsend & Brickenstein
his Attorney Patented Dec. 15, 1931

1,836,947

UNITED STATES PATENT OFFICE

WINFIELD S. ZEHRUNG, OF OIL CITY, PENNSYLVANIA

PROCESS OF REFINING CRUDE MINERAL OILS

Application filed June 1, 1926. Serial No. 113,027.

This invention relates to a method of producing lubricating oils from crude mineral oil, petroleum and the like.

The processes for obtaining lubricating oils from mineral oils heretofore generally used involve several distinct operations. For instance, mineral oil is first fractionally distilled in order to separate it into products of different boiling points. The high boiling fractions which contain lubricants must then be refined by subjecting them to further treatments such as redistilling, filtering, dewaxing, etc., before a product is obtained which is suitable for use as a lubricant.

According to the process of this invention, lubricants are obtained from crude mineral oil such as petroleum oil directly and in a fewer number of operations than are required by the processes generally used heretofore. For this reason the process of this invention is quicker and more economical than the processes heretofore used.

The process consists generally in distilling the crude mineral oil in the presence of an adsorbent. Crude mineral oil is mixed with an adsorbent or decolorizing agent such as finely divided fuller's earth (Floridin) bauxite montmorillonite or any other suitable finely divided decoloring agent. The mixture is heated by any suitable means, for example by passing it through a pipe heater. The temperature is elevated sufficiently to drive off the lower boiling fractions. These lower boiling fractions are then separated and the remaining high boiling lubricating fractions containing the adsorbent are separated from the adsorbent by filtration or in any other suitable way. The filtrate is suitable for use as a lubricant directly or it may be subjected to further treatments in order to obtain a more highly refined product.

The lower boiling fractions may be further refined by means of the usual dephlegmators or towers.

The temperature to which the mixture of crude mineral oil and adsorbent is heated may vary considerably. It may be run up to any desired temperature provided that the speed with which the mixture is put through the heater is raised proportionately. However, the temperature should be kept at such a level that at a given speed of throughput it does not cause objectionable cracking.

The process of this invention may be carried out in any suitable form of apparatus. The single figure of the accompanying drawing illustrates one type of suitable apparatus. It is to be understood however that the process is not restricted for its operation to this particular form of apparatus.

To the crude petroleum oil, is first added, in a vessel 1, equipped with mechanical or other suitable agitating means, an amount of adsorbent such as finely ground Floridin which has been previously determined as the correct amount to produce the required color in the product. This amount may be calculated in the control laboratory by treating directly with the adsorbent the same lubricating oil produced by present known processes. Also the amount of adsorbent which is necessary may be determined experimentally in the laboratory by treatment of the crude mineral oil with the adsorbent which is to be used. The mixture of oil and clay is pumped rapidly by means of pump 2 through a single pass pipe heater 3, wherein the mixture is heated to such a temperature that the lower boiling fractions leave the still as vapor. The discharge from the pipe still or heater is passed into a separating tank 5 from which the vapors are allowed to escape through a vapor exit 6 to suitable treating apparatus such as rectifying towers and condensers (not shown), while the residual oil and clay pass through pump 7 to a filter press 8. By means of this filter the oil and clay are separated and an oil is thus obtained which may be used at once as a lubricant or which may be further refined.

The process is applicable to any crude mineral oil which contains lubricating fractions. It may also be used on a mineral oil from which part of the lower boiling fractions have been separated.

I claim:

The process of producing a "filtered" or partially decolorized lubricating oil and simultaneously separating lighter oil fractions directly from a crude mineral oil, which comprises heating a mixture of crude mineral oil and a finely divided mineral earth adsorbent in a restricted stream and to a temperature sufficient to vaporize the oils lighter than lubricants and proportionate to the speed of the restricted stream of the mixture whereby to avoid objectionable cracking, directing the restricted stream into an enlarged zone to permit the lighter oil vapors to pass from the mixture without the aid of steam, removing the residual mixture, and separating the residual lubricant from the adsorbent.

In testimony whereof, I affix my signature.

WINFIELD S. ZEHRUNG.